United States Patent [19]

Thompson et al.

[11] 4,422,963

[45] Dec. 27, 1983

[54] LIGHT VALVE POLARIZING MATERIALS AND SUSPENSIONS THEREOF

[75] Inventors: Robert I. Thompson, Plainview; Robert L. Saxe, New York, both of N.Y.

[73] Assignee: Research Frontiers Incorporated, Plainview, N.Y.

[21] Appl. No.: 960,842

[22] Filed: Nov. 15, 1978

Related U.S. Application Data

[63] Continuation-in-part of Ser. No. 795,760, May 11, 1977, abandoned.

[51] Int. Cl.$^3$ ............................................. G02F 1/07
[52] U.S. Cl. .................................. 252/583; 350/356; 350/362
[58] Field of Search .................... 252/300; 260/284; 350/154, 362, 356

[56] References Cited

U.S. PATENT DOCUMENTS

| | | | |
|---|---|---|---|
| 1,951,664 | 3/1934 | Land | 350/154 |
| 1,956,867 | 5/1934 | Land | 350/154 |
| 2,176,516 | 10/1939 | Wilmanns et al. | 350/154 |
| 2,178,996 | 11/1939 | Land | 350/154 |
| 2,226,568 | 12/1940 | Marks | 260/284 |
| 2,289,712 | 7/1942 | Land et al. | 350/154 |
| 2,344,117 | 3/1944 | Vierling et al. | 350/154 |
| 3,655,267 | 4/1972 | Forlini | 350/362 |
| 4,025,163 | 5/1977 | Saxe et al. | 350/160 R |
| 4,078,856 | 3/1978 | Thompson et al. | 350/362 |

OTHER PUBLICATIONS

CRC Handbook of Chem. & Phys., 53rd Edition, p. B-73, "Bismuth, iodide, tri" 1972.

Primary Examiner—Deborah L. Kyle
Attorney, Agent, or Firm—Jacobs & Jacobs

[57] ABSTRACT

A light-polarizing perhalide of an alkaloid acid salt having incorporated in its molecular structure a chloride, bromide, or iodide of calcium, rubidium, cesium or bismuth, and a light valve containing a suspension of particles of such perhalide.

2 Claims, No Drawings

LIGHT VALVE POLARIZING MATERIALS AND SUSPENSIONS THEREOF

The present application is a continuation-in-part of our copending application, Ser. No. 795,760 filed May 11, 1977, now abandoned.

This invention relates to light-polarizing perhalide materials having improved properties, and especially to colloidal particles of such materials. This invention also relates to suspensions of such materials which may be used in light valves.

Light-polarizing materials of many kinds are well known and have been used commercially for a variety of purposes including use as polarizing filters in instruments, sunglass lenses, and as part of fluid suspensions used as the working fluid in light valves.

Perhalide (sometimes also referred to as "polyhalide") particles constitute one class of light-polarizing materials. Perhalide particles of many types have been studied by many investigators. Extensive studies were carried out in the 19th century by Jorgensen, and products incorporating periodide light-polarizing particles were produced in the 20th century by others, for example in set suspensions used in sheet polarizers.

One problem associated with perhalide particles, especially organic perhalide particles in suspension, has been a need to improve their stability, particularly with respect to heat and exposure to chemicals.

A second problem associated with the perhalide particles is that it has not been possible heretofore to consistently obtain stable particles of small enough size. Small size is important in a suspension in order to avoid significant amounts of light scatter and to lessen the tendency of particles to agglomerate when a suspension of them is used in a light valve.

The ability to produce particles of extremely small size is important for another reason, namely that if such particles when initially formed are extremely small, it is possible to control their growth during the chemical process wherein particles and suspensions are produced, so as to produce particles of a somewhat larger optimum or desired size.

Light valves incorporating fluid suspensions have been known for many years. Fluid suspensions of herapathite particles, an unstable light-polarizing periodide material, have heretofore been commonly preferred, although other types of particles have been suggested. In general, the shape of the particles used in such a light valve should be such that in one orientation they intercept more light than in another orientation. Particles which are needle-shaped, rod-shaped, lath-shaped, or in the form of thin flakes, have been suggested. The particles may variously be light absorbing or light reflecting, polarizing, birefringent, metallic or non-metallic, etc. In addition to herapathite, many other materials have been suggested such as graphite, mica, garnet red, aluminum, periodides of alkaloid sulphate salts, etc. Preferably, dichroic, birefringent or polarizing crystals are employed.

Very finely divided or minute particles, preferably colloidal, are employed and are suspended in a liquid in which the particles are not soluble, and which is of suitable viscosity and relatively high electrical resistivity. In order to help stabilize the suspension when in the non-actuated state, a protective colloid, preferably a suitable polymer, should be used to prevent agglomeration or settling.

Both electric and magnetic fields have been suggested for aligning the particles, although electric fields are more common. To apply an electric field, conductive area electrodes are provided on a pair of oppositely disposed walls of the cell, and an electric potential applied thereto. The electrodes may be thin transparent conductive coatings on the inner sides of the front and rear walls of the cell, thereby forming an ohmic type cell wherein the electrodes are in contact with the fluid suspension. It has also been suggested to cover the electrodes with a thin layer of transparent material such as glass in order to protect the electrodes. Such thin layers of glass form dielectric layers between the electrodes and the fluid suspension, and the cells may be terms capacitive cells. Direct, alternating and pulsed voltages have been applied to the electrodes in order to align the particles in the fluid suspension. When the voltage is removed, the particles return to a disoriented random condition due to Brownian movement.

Commonly the front and rear walls of the cell are transparent, for example, panels of glass or plastic. With no applied field, and random orientation of the particles, the cell has a low transmission to light and accordingly is in its closed condition. When a field is applied, the particles become aligned and the cell is in its "open" or light transmitting condition. Instead of making the rear wall transparent, it may be made reflective or a reflective layer may be placed behind it. In such case light is absorbed when the cell is unenergized and is reflected when the cell is energized. These principal actions may be modified by employing light-reflecting rather than light-absorbing particles.

Light polarizing perhalides of alkaloid acid salts have been extensively described in the literature. The term "alkaloid" is used herein to mean an organic nitrogenous base, as defined in Hackh's Chemical Dictionary, Fourth Edition, McGraw-Hill Book Company, New York, 1969. Thus, U.S. Pat. No. 1,956,867 discloses light-polarizing perhalides of toluidine and other alkaloid acid salts. U.S. Pat. No. 2,176,516 refers to light polarizing perhalide of salts of inorganic acids and heterocyclic organic nitrogen bases. See also U.S. Pat. No. 2,344,117. Preferably, the alkaloid is a quinine alkaloid as defined in Hackh's Chemical dictionary, supra. U.S. Pat. Nos. 1,951,664, 2,178,996 and 2,289,712 refer in detail to quinine alkaloid inorganic acid salts.

As aforesaid, one of the most common materials heretofore used in light valve suspensions is herapathite as disclosed in the Land patents, U.S. Pat. No. 1,951,664 and U.S. Pat. No. 1,955,923. Herapathite is quinine bisulfate periodide, the formula for which is stated in the Merck Index (8th Edition) as $4C_{20}H_{24}N_2O_2.3H_2SO_4.2HI.I_4.6H_2O$. The Merck Index is published by Merck & Co., Inc., Rahway, New Jersey. Herapathite, although an effective polarizing material, is not stable either to heat or to small or even trace amounts of certain types of chemicals. Because, in many uses, suspensions are subject to exposure to either or both conditions, it is important and usually essential that the particles and suspension not be subject to degradation due to heat or exposure to chemicals during or after their formation.

It is particularly important to avoid deterioration of particles and suspension, so that the suspension can be used as the working material in light valves. For example, it has been observed that a suspension of herapathite particles suspended in isopentyl acetate liquid or other similar liquid esters, together with the polymer nitrocellulose which is used to help keep the particles suspended in the manner of the prior art, will change color from blue initially to red-purple after a period of several months, even at room temperature. At higher temperatures, the color degradation may be even more severe and takes place much more rapidly.

Also, in order to prepare a suspension of herapathite or the improved materials of this invention the particles must be prepared in the presence of solvents, some of which may remain in trace amounts in the final fluid suspension. If such chemical solvents degrade the suspended particles, as is evidenced, for example by a color change or a loss in the optical density of the suspension, the particles and suspension are unlikely to be commercially usable over a long period of time. Accordingly, herapathite is an inferior material for use in a light valve suspension because it partially decomposes when in contact with common solvents such as methanol, a type of alcohol, and 2-ethoxyethanol, an ether-alcohol, which liquids or others similar to them are often necessarily present during particles formation. Degradation products of the aforesaid nitrocellulose such as nitrous acid also seem to attack herapathite.

Accordingly, efforts have been made over the years to find light-polarizing materials that were more stable than herapathite. One such herapathite-like material is described in U.S. Pat. No. 2,178,996 to Land, whereby a solution of a cinchona alkaloid sulfate is reacted with ammonium iodide and iodine. A possible formula for one such compound would be the same as the above formula for herapathite, but with ammonium iodide, $NH_4I$, substituted for HI, which is hydriodic acid.

Some additional possible iodides which may be substituted for HI to form similar compounds and which are mentioned in U.S. Pat. No. 2,289,712 to Land et al, include potassium iodide, sodium iodide, magnesium iodide, barium iodide, arsenic triiodide, antimony triiodide, stannic iodide and ferrous iodide.

Unfortunately, none of the alternative iodides to HI mentioned in the preceding two paragraphs permits one to produce, consistently and uniformly, particles which are small enough to permit controlled particle growth during formation so as to reach the desired colloidal size range for use in a light valve suspension. The particles used in a light-valve suspension should be small enough to avoid any substantial light scattering and any pronounced tendency to agglomerate when the suspension is subjected to an electric field to activate the light valve, but large enough so that it is not necessary to use an undesirably high field or voltage gradient to orient the particles.

Thus it is an object of this invention to provide a light-polarizing material which is capable of withstanding deterioration from the effect of heat.

It is a further object of this invention to provide a light-polarizing material capable of withstanding degradation from the effect of lower alcohols and ether-alcohols.

It is another object of this invention to provide a light-polarizing material which can be formed as extremely small colloidal particles.

It is another object of this invention to provide a fluid suspension that includes light-polarizing particles of the aforesaid material, which suspension may be used as the working fluid in a light valve.

This invention relates to light-polarizing materials and particularly to materials which can comprise the suspended particles in suspension, e.g., colloidal suspensions for use in fluid suspension light valves. The suspended material in such a fluid suspension must be able to withstand the effects of contact with various chemicals, specifically lower alcohols and ether-alcohols, and such materials and suspensions thereof should be able to withstand exposure to temperature substantially above room temperature for a reasonably long period of time.

The particles of the present invention are light-polarizing perhalide particles, preferably periodide particles. In order to describe the polarizing materials fully, the general procedure by which they can be produced shall be stated first, after which specific examples and details shall be given.

Formations of light polarizing perhalides of alkaloid acid salts is well known in the art, and comprises the reaction of alkaloid acid salt with a mixture of elemental iodine and a hydrohalide acid or ammonium or metal halide or a mixture thereof, in a suitable solvent, such as an alcohol or ether-alcohol. See U.S. Pat. Nos. 1,951,664, 2,176,516, 2,178,996 and 2,289,712. Preferably, the reaction to form the perhalide takes place in the presence of a protective colloid, such as nitrocellulose or a copolymer as disclosed in U.S. Ser. No. 932,512 filed Aug. 10, 1978. The light polarizing materials used in the light valve of the present invention are formed in the same way by reacting the acid salt of the alkaloid with iodine and the halide, except that in the present invention the halide is a chloride, bromide or iodide of calcium, rubidium, cesium or bismuth, or a mixture of two or more thereof.

The prior art perhalides are based on salts formed by reacting the alkaloid with sulfuric acid or other inorganic acid. Sulfuric acid, however, is not the only appropriate acid usable in forming light-polarizing perhalide particles including the materials of the present invention. It has been found that polybasic organic acids, and hydroxy and polyhydroxy polybasic acids, are also appropriate for such use. Examples of such organic acids include mucic acid, terephthalic acid, and pyromellitic acid, as described in copending application Ser. No. 956,418, filed Oct. 31, 1978, of Robert L. Saxe.

Examples of useful alkaloids include heterocyclic organic nitrogenous bases such as pyridine, picoline, diphenyl oxazole, quinoline, quinaldine and caffeine; quinine, cinchonidine, hydroquinine, hydrocinchonidine, hydrocinchonine, hydroquinidine and other quinine alkaloids; and toluidine and the like.

Although various iodides have been mentioned in the prior art as possible substitutes for HI in making more stable herapathite-like periodide particles, particles that incorporate there iodides have been found to be inadequate for use in polarizing suspensions, e.g., light valve suspensions, because they either generally produce larger than colloidal size particles, which in suspension scatter a substantial amount of light, or because they produce a heterogenous mixture of particles of many sizes including some in the colloidal range but having a largest dimension of nearly 1 micron. Particles that have a largest dimension of more than or nearly 1 micron are far less useful in a light valve suspension than smaller particles, because the larger particles have a much more pronounced tendency to agglomerate when an electric field (AC voltage) is applied across the suspension in the light valve to cause the anisometrically shaped particles to align.

Therefore, it is both surprising and useful to have discovered that much smaller, and in some cases, extremely small and stable colloidal particles can be formed if certain particular metal halides are used in forming perhalide particles instead of those cited in the prior art.

In particular, we have found that halides of the formula $MX_n$ give the desired results, wherein M is calcium, cesium, rubidium or bismuth, X is chlorine, bromine or iodine and n is the valence of M. Useful halides include $CaI_2$, CsI, RbI, $BiI_3$, $CaBr_2$, CsBr, RbBr, $BiBr_3$, $CaCl_2$, CsCl, RbCl, and $BiCl_3$. When bismuth halides are used, the solvent preferably contains a small amount of HI sufficient to dissolve the bismuth halide; This is readily ascertainable on an empirical basis.

EXAMPLE 1 describes the preparation of a typical perhalide of this invention, wherein $CaI_2$ is used as the metal iodide.

EXAMPLE 1

Process and Formulation for Making Hydrocinchonidine Sulfate Periodide

A typical formation and process which can be used to prepare hydrocinchonidine sulfate periodide is as follows:

| | Solution A |
|---|---|
| 3.75 g. | Hydrocinchonidine sulfate |
| 20.00 g. | 2-ethoxyethanol |
| 10.00 g. | $H_2O$ |
| | Solution B |
| 10.00 g. | tricresyl phosphate (TCP) |
| 42.52 g. | of a 33⅓% solution of nitrocellulose in 2-ethoxyethanol. The nitrocellulose should be a mixture of low viscosity (18.6 cps) and high viscosity (17 second) types, 50% each. |

Mix Solution A with Solution B. This combination mixture is called Solution C.

| Solution D | |
|---|---|
| 0.49 g. | $CaI_2$ |
| 12.00 g. | n-propanol |
| Then add: | |
| 3.04 g. | $I_2$ |
| 35.00 g. | TCP |
| Shake well for 15 minutes. | |

Solution C is combined with Solution D, with vigorous mixing, until a product is formed having a deep blue color in a gel formation. This product, which includes a very large number of extremely small particles is referred to herein as a "wet paste".

Drying can be accomplished by spreading the wet paste as a film, approximately 12 mils thick, on a glass plate, and then allowing the volatile solvents in the paste to come off. For a film 12 mils thick about 3 hours is required for drying. The film in any event, should be dried until there is no significant odor from it. The resulting product is referred to herein as a "dry paste". Tricresyl phosphate, a high-boiling point plasticizer, may be used in the above formulation but its use is optional. However, its use can facilitate the spreading of a wet paste and subsequent dispersion of a dry paste.

After drying, a paste may be dispersed into a suspending medium. To accomplish this the dry paste should first be shaken, ground, or otherwise well mixed into a suspending medium to make a suspension. Any liquid or combination of liquids which has a relatively high electrical resistivity, does not degrade or attack the particles or other components of the suspension, and which dissolves the protective colloid, such a nitrocellulose polymer, which is used in the suspension to stabilize it, may be employed as a suspending medium. Non-limiting examples for suspension liquids include esters such as isopentyl acetate, dioctyl phthalate, diisodecyl adipate, and para-nonylphenyl acetate. Non-solvents for the polymer may also be used to some degree as part of the suspending medium if they do not cause the polymer to precipitate out.

The suspension may, for example, be well dispersed by subjecting an undispersed mixture of dried paste and liquid suspending medium to ultrasonic agitation for a sufficiently long time, which may require in excess of 10 hours using a Bransonic 32, an ultrasonic mixer sold by the Branson Instrument Co. of Stamford, Conn. Additional liquid suspending media or other materials may be added to the suspension after its dispersion in order to make it less concentrated or for other purposes such as altering its viscosity.

The dispersed suspension may be cleaned. One method for accomplishing this is to add to the suspension a sufficiently large quanitity of a liquid that is a non-solvent for the polymeric protective colloid, so as to cause the polymer to precipitate from solution. Because the polymer is bonded to the suspended particles, the latter are also dragged out of suspension when the polymer is precipitated. For example, if the polymer is nitrocellulose, hexane can be used as the non-solvent to cause precipitation. The supernatant may be discarded and the precipitated particles and polymer resuspended in a suitable suspending medium. In such case, it is usually preferable to vigorously disperse the new suspension, e.g. by ultrasonic mixing and agitation.

Particle size fractions can be selected from the suspension by conventional centrifugation methods. The relatively large particles in such a suspension can usually be removed by centrifuging at 4700 r.p.m. for about 20 minutes.

Although calcium iodide is used as the iodide in EXAMPLE 1, the other halides, $MX_n$, can be used in its stead. Preferably, the halide, $MX_n$, and elemental iodine are used in excess of their stoichiometric amounts, such as up to a four-fold excess. Any excess iodine and halide are removed during the cleaning step.

The halide used to form the light-polarizing material can be a chloride, bromide or iodide, or a mixture of halides. Substitution of bromine atoms for iodine atoms in the halide, $MX_n$, tends to change the spectral characteristics of the resulting light-polarizing particles, generally shifting them from dark blue for an iodide toward the red-brown for a bromide, with intermediate shades expected for particles incorporating a combination of bromine and iodine atoms. The term "perhalide" as used herein includes all such combinations as well.

EXAMPLE 2

EXAMPLE 1 is repeated except that 0.88 g. of $CaBr_2$ is substituted for 0.49 g. of $CaI_2$, with similar results.

The starting material need not be hydrocinchonidine. EXAMPLES 3, 4, 5, and 6 relate to other starting materials which similarly can be reacted and processes as aforesaid to form light-polarizing particles.

EXAMPLE 3

EXAMPLE 1 is repeated, but with hydroquinine sulfate substituted for hydrocinchonidine sulfate, with similar results.

EXAMPLE 4

EXAMPLE 1 is repeated, but with hydroquinidine sulfate substituted for hydrocinchonidine sulfate, with similar results.

EXAMPLE 5

EXAMPLE 1 is repeated, but with hydrocinchonine sulfate substituted for hydrocinchonidine sulfate, with similar results.

EXAMPLE 6

EXAMPLE 1 is repeated, but with quinine bisulfate substituted for hydrocinchonidine sulfate, and with water omitted from the formulation, with similar results.

EXAMPLE 7

EXAMPLE 6 is repeated but with CsI substituted for $CaI_2$, with similar results.

EXAMPLE 8

EXAMPLE 6 is repeated but with RbI substituted for $CaI_2$, with similar results.

Also, as previously mentioned, appropriate acids may be used instead of sulfuric acid to form the precursor salt employed in EXAMPLES 9 through 11, with similar results.

EXAMPLE 9

EXAMPLE 1 is repeated, except that hydrocinchonidine mucate is substituted for hydrocinchonidine sulfate, and a small amount of concentrated sulfuric acid (at least 0.25 g.) is added to the reaction mixture to facilitate the reaction with similar results.

EXAMPLE 10

EXAMPLE 1 is repeated, except that hydrocinchonidine terephthalate is substituted for hydrocinchonidine sulfate, and a small amount of concentrated sulfuric acid (at least 0.25 g.) is added to the reaction mixture to facilitate the reaction, with similar results.

EXAMPLE 11

EXAMPLE 1 is repeated, except that hydrocinchonidine pyromellitate is substituted for hydrocinchonidine sulfate, and a small amount of concentrated sulfuric acid (at least 0.25 g.) is added to the reaction mixture to facilitate the reaction, with similar results.

EXAMPLE 12

Solution A is prepared by dissolving 3.75 g. quinine bisulfate in 10.00 g. methanol, 10.00 g. chloroform and 20.00 g. n-propanol and then adding 6.00 g. of a 50% solution of a copolymer of 80% by weight 2-ethylhexyl acrylate and 20% by weight acrylic acid.

Solution B is prepared by dissolving 0.14 g. $BiI_3$ in 20.00 g. n-propanol and 0.26 g. of a 47% aqueous solution of HI, and then adding 2.12 g. $I_2$ and 15.00 g. dioctyl sebacate, with shaking.

Solutions A and B are mixed together and almost instantaneously a slightly viscous product is formed having a blue color. This product is dried as in Example 1 to form a dry paste.

EXAMPLE 13

The procedure of Example 12 is repeated, except that the 0.14 g. of $BiI_3$ is replaced by a mixture of 0.07 g. $CaCl_2$ and 0.06 g. $BiI_3$. A dry paste having a blue color is obtained.

EXAMPLE 14

The procedure of Example 12 is repeated, except that the 0.14 g. of $BiI_3$ is replaced by 0.14 g. $BiCl_3$. A blue-purple dry paste is obtained.

EXAMPLE 15

The procedure of Example 12 is repeated, except that the 0.14 g. of $BiI_3$ is replaced by 0.14 g. of $CaCl_2$ and the 0.26 g. of HI solution is omitted. A blue-purple dry paste is obtained.

EXAMPLE 16

Dry pastes of the periodide of hydrocinchonidine sulfate (HCS) prepared using potassium iodide, ammonium iodide or calcium iodide and dry pastes of quinine bisulfate (QBS) prepared using potassium iodide, rubidium iodide or cesium iodide were dispersed into isopentyl acetate using the procedure described above. A light valve having a spacing between opposed walls of 33 mils is filled with each suspension and the concentration of the dry paste in the suspension is adjusted beforehand to provide the suspension with an optical density of 3.0 when no field is applied to the valve. A voltage of 1000 volts (peak to peak) is applied across the suspension in the light valve for 40 milliseconds to "open" the valve and then discontinued. The optical density of the suspension is continuously measured until the optical density reaches 3.0 again. The time for the suspension to reach the 3.0 optical density is a measure of its particle size. Smaller particles will become more rapidly in disoriented than larger particles. The results are reported in Table I below.

TABLE I

| Periodide | Optical Density | | Closing Time Milliseconds |
|---|---|---|---|
| | Closed | Open | |
| HCS Sulfate.KI | 3.0 | 1.2 | 165 |
| HCS Sulfate.$NH_4I$ | 3.0 | 1.1 | 160 |
| HCS Sulfate.$CaI_2$ | 3.0 | 1.4 | 40 |
| QBS Sulfate.KI | 3.0 | 1.4 | 140 |
| QBS Sulfate.RbI | 3.0 | 0.8 | 75 |
| QBS Sulfate.CsI | 3.0 | 1.6 | 60 |

The data in Table I (and in Table II below) show that for each periodide, the use of calcium, rubidium, cesium or bismuth halide in place of the prior art potassium or ammonium halide results in much smaller perhalide particle sizes.

The apparatus employed in this example comprises a tungsten lamp and a photocell on opposite sides of the light valve. The output of the photocell is applied to an oscilloscope calibrated to read in optical density versus time.

EXAMPLE 17

The procedure of Example 16 is repeated, but at 250 volts (peak to peak) using the dry pastes of Examples 12-15, with the results shown in Table II below.

TABLE II

| Periodide of Example | Optical Density Closed | Optical Density Open | Closing Time (Milliseconds) |
|---|---|---|---|
| 12 | 3.0 | 2.0 | 80 |
| 13 | 3.0 | 1.0 | 80 |
| 14 | 3.0 | 0.9 | 82 |
| 15 | 3.0 | 1.1 | 78 |

As is evident from the Examples, the particles are formed in a chemical environment that may include alcohols, e.g., n-propanol and ether-alcohols, e.g., 2-ethoxyethanol. The polarizing materials of the present invention have been found to be highly stable in such environments relative to other known periodide polarizing particles. The chemical stability of a dry paste with respect to a given solvent can be readily ascertained by mixing a specific quantity of the paste into a quantity of the solvent and observing whether a change in the color of the paste takes place and, if so, at what rate. This may be compared with the color of the paste when it is dispersed in a known non-solvent for the particles such as dioctyl phthalate (DOP) or dioctyl adipate (DOA), or a combination of DOP or DOA with a halogenated liquid such as dibromotetrafluoroethane. One can test bare particles for their chemical stability by following the aforesaid test procedure after first having prepared a paste without polymer or plasticizer present. If a solvent attacks or dissolves the bare particles, a strongly tinted solution may be observed, whereas little or no tint is observed in the case of non-solvent.

The extremely small colloidal size of many of the particles of this invention can be confirmed by electron micrographs. Also the size can be predicted by observing the decay time of a suspension thereof in a light valve. Large particles of the prior art can require up to several hundred milliseconds to disorient after being oriented in a light valve by an electric field, and the field turned off. By comparison, particles of this invention have been observed to disorient as rapidly as 1 millisecond.

Particles of this type which when initially formed are extremely small, can be allowed to grow larger controllably by using one or more of a variety of methods. One method of promoting growth is by adding water to the reaction mixture, the more water the more growth. Another method is to decrease the viscosity of the reaction mixture e.g., by using greater amounts of liquids. On the other hand, growth tendencies can be inhibited by drying a wet paste under conditions of low relative humidity.

Suspensions of the light-polarizing particles of this invention have been used successfully as the working fluids in fluid suspension light valves, as previously described. Light valves can use continuous area electrodes within the active region of the cells, or the electrodes may be formed in patterns so as to exhibit a desired display. Further, instead of allowing light to pass through the cell from front to rear, the rear surface may be made reflective so as to provide a mirror of variable reflectivity.

Although specific embodiments of the invention have been described, it will be appreciated that many modifications thereon may be made by one skilled in the art, which fall within the spirit and scope of this invention.

What is claimed is:

1. A light polarizing perhalide of an alkaloid acid salt having incorporated in its molecular structure at least one halide of the formula $$MX_n$$

wherein M is rubidium or cesium, X is chlorine, bromine or iodine and n is the valence of M, said perhalide being the reaction product of an alkaloid acid salt, elemental iodine and said halide.

2. In a light valve, comprising a cell having opposed walls and containing a suspension of light polarizing particles in a liquid suspending medium, said suspension being operable to transmit more light through said suspension when an electric or magnetic field is applied across said cell walls than when said field is not applied, the improvement wherein said light polarizing particles are colloidal particles of a light-polarizing perhalide of an alkaloid acid salt having incorporated in its molecular structure at least one halide of the formula $$MX_n$$

wherein M is rubidium or cesium, X is chlorine, bromine or iodine and n is the valence of M, said perhalide being the reaction product of an alkaloid acid salt, elemental iodine and said halide.

* * * * *